June 4, 1968     P. G. IVANCHICH     3,386,302
MULTIPLE SPEED RATIO, SYNCHRONIZED TORQUE
TRANSMISSION MECHANISM
Filed May 2, 1966     6 Sheets-Sheet 3

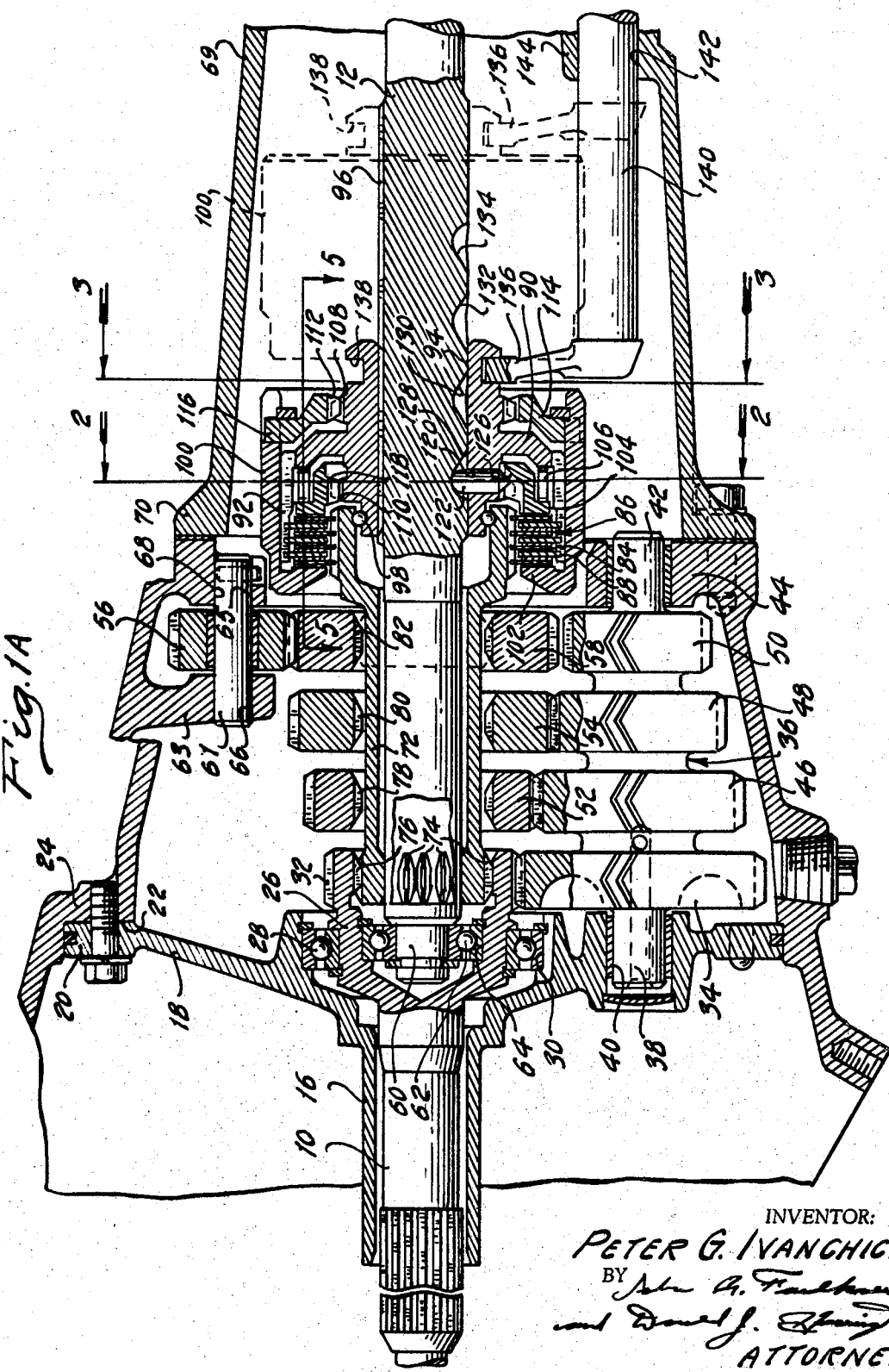

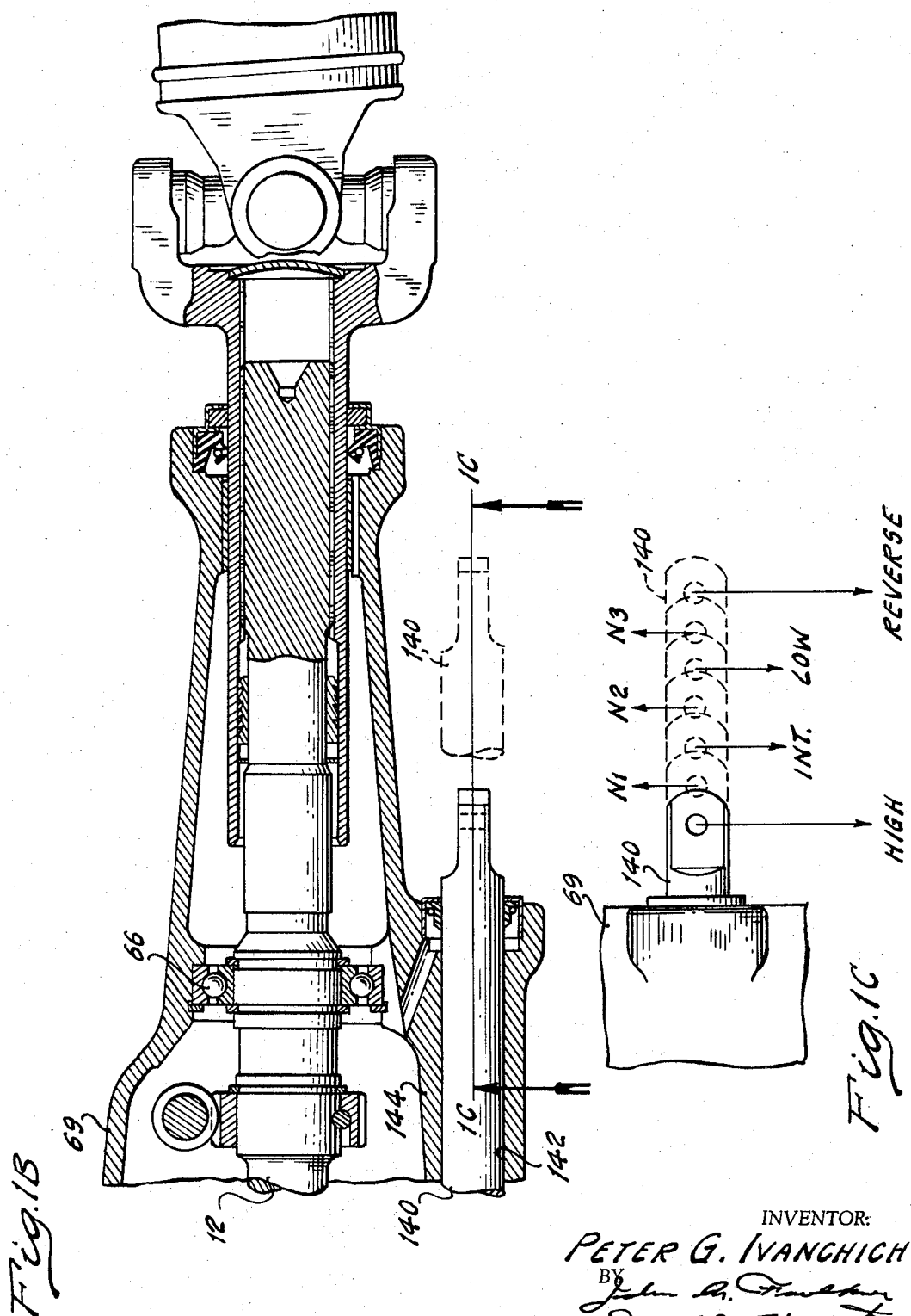

INVENTOR:
PETER G. IVANCHICH
BY
ATTORNEYS.

June 4, 1968 P. G. IVANCHICH 3,386,302
MULTIPLE SPEED RATIO, SYNCHRONIZED TORQUE
TRANSMISSION MECHANISM
Filed May 2, 1966 6 Sheets-Sheet 4
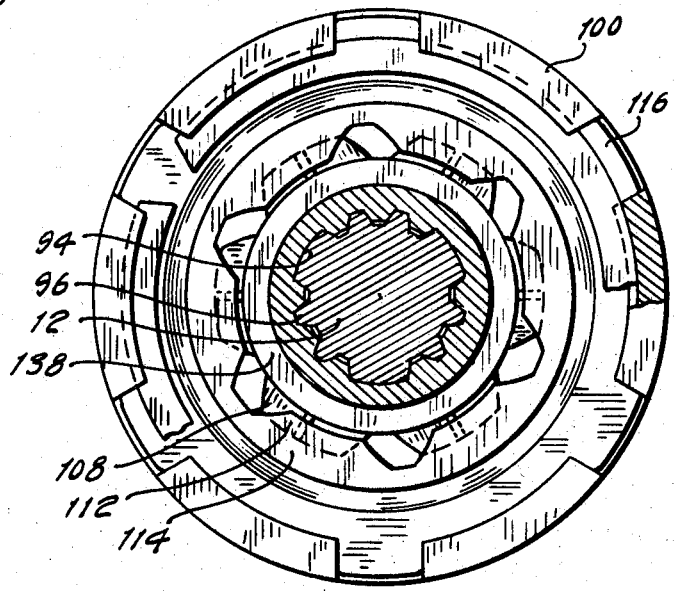
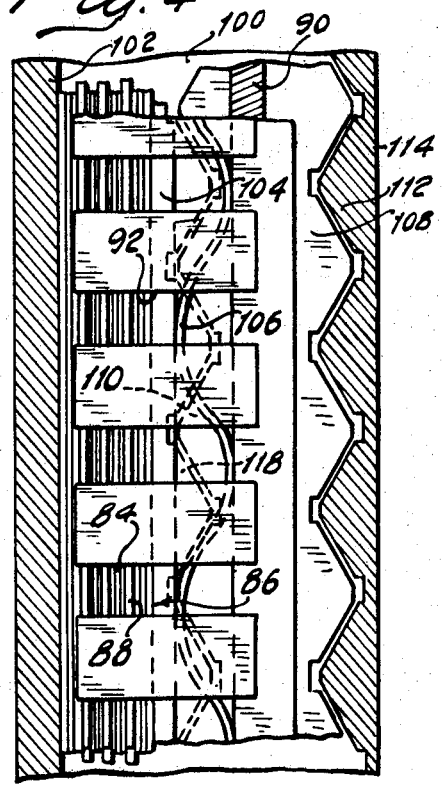
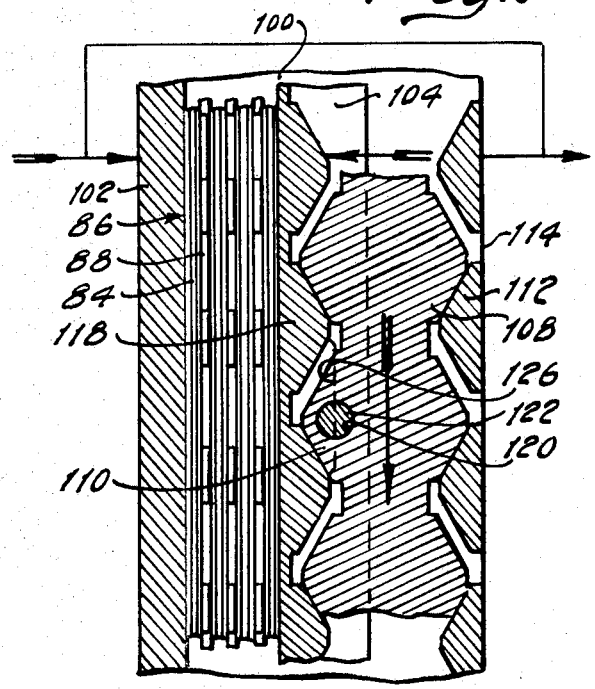
INVENTOR:
PETER G. IVANCHICH
BY
ATTORNEYS.

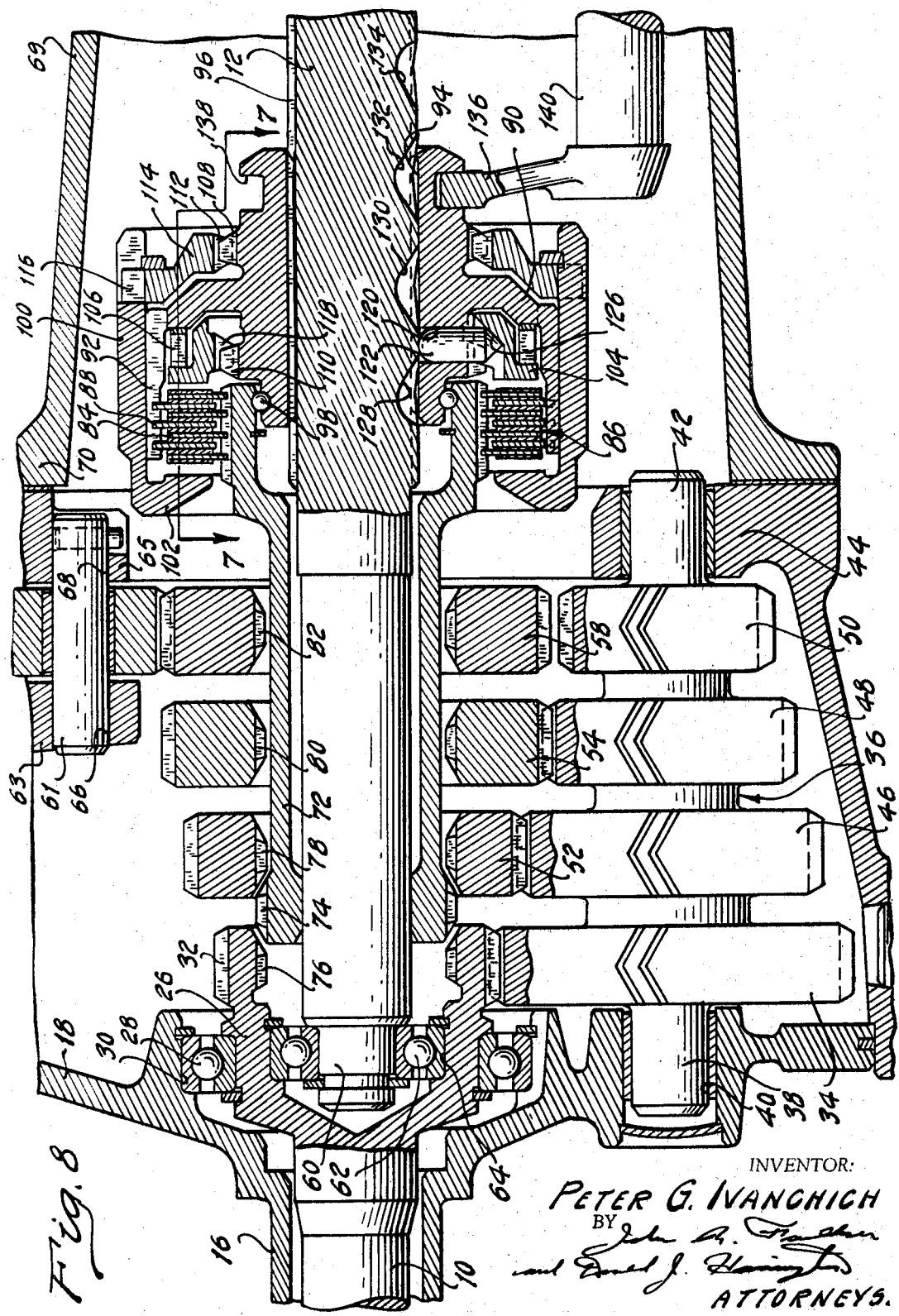

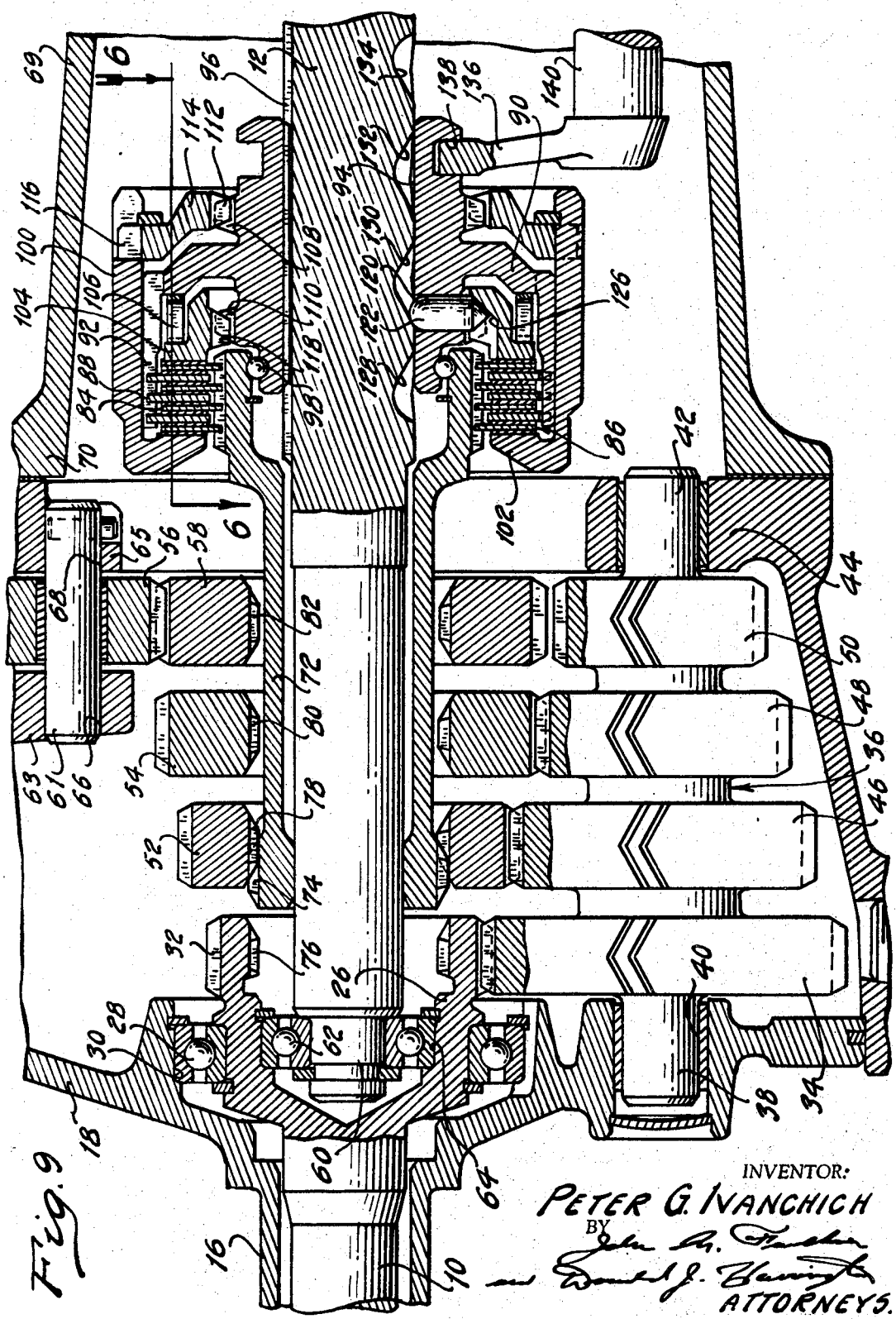

United States Patent Office 3,386,302
Patented June 4, 1968

3,386,302
MULTIPLE SPEED RATIO, SYNCHRONIZED
TORQUE TRANSMISSION MECHANISM
Peter George Ivanchich, Dearborn, Mich., assignor to
Ford Motor Company, Dearborn, Mich., a corporation of Delaware
Filed May 2, 1966, Ser. No. 546,881
12 Claims. (Cl. 74—339)

ABSTRACT OF THE DISCLOSURE

This specification describes a manually-controlled, multiple-ratio, geared transmission for use in an automotive vehicle driveline. The transmission includes a clutch sleeve engageable selectively with each of several power output gears. A synchronizer clutch assembly which surrounds a common axis for the output gears synchronizes the motion of the sleeve with respect to the gears prior to clutching engagement. It functions also to disconnect the synchronizer sleeve shaft from other rotating inertia masses in the gear system during ratio changes thus improving shift quality.

In a preferred form of my invention I have provided a series of coaxially mounted torque output gears which mesh with cluster gear assemblies mounted for rotation about angularly spaced axes. These axes are parallel to the axis of the common torque output gears. Means are provided for establishing a driving connection between a power input shaft and the cluster gear assemblies. The torque output gears are rotatably supported by the cluster gear assemblies.

A synchronizer clutch shaft, which extends through the torque output gears, carries positive engagement clutch teeth that are adapted to mesh with clutch teeth carried by each of the individual torque output gears. As the synchronizer clutch shaft is shifted in the direction of the common axis of the torque output gears, the clutch teeth of the clutch shaft selectively engage the clutch teeth of the various torque output gears thereby establishing a geared, driving connection between the torque input shaft and the synchronizer clutch shaft.

An improved synchronizer clutch mechanism is adapted to establish selectively a driving connection between the synchronizer shaft and the power output shaft. Such a connection is made as the positive engagement teeth of the synchronizer shaft engage the teeth of the various torque output gears as they are selected. This occurs with a cushioning action. The harshness in the ratio shifts and torsion strains due to inertia loads are reduced to a minimum.

The provision of a power transmission system of the type above set forth being an object of my invention, it is a further object of my invention to provide a multiple speed ratio power transmission mechanism having multiple torque delivery gears that can be selectively clutched to a driven shaft by means of an improved synchronizer clutch assembly with minimum inertia forces by employing a simple, transverse, shifting movement of a driver controlled member of the synchronizer clutch mechanism.

It is a further object of my invention to provide a power transmission system as above set forth wherein provision is made for interrupting the torque delivery path from the driving member to the driven shaft as positive drive teeth of the synchronizer shaft register with the clutch teeth of the torque output gears.

It is a further object of my invention to provide a mechanism of the type set forth in the preceding object wherein provision is made for reducing to a minimum the moment of inertia of the rotary portions of the synchronizer mechanism that drivably engage the torque gears during the initial stages of the ratio shift interval.

It is a further object of my invention to provide a power transmission system of the type above set forth wherein provision is made for engaging with a smooth, cushioning action the synchronizer clutch following engagement of the shaft with the torque output gears and wherein the degree of engagement of the synchronizer clutch is proportional to the magnitude of the torque being delivered through it.

Further objects and features of my invention will become apparent from the following description and the accompanying drawings wherein:

FIGURES 1A, 1B and 1C show in longitudinal cross-sectional form a transmission assembly embodying the improvements of my invention, the torque delivery elements of the assembly being conditioned for direct drive operation;

FIGURE 3 is a cross-sectional view as seen from the plane of section line 3—3 of FIGURE 1A;

FIGURE 4 is a diagrammatic view of the cam teeth for the synchronizer clutch assembly of FIGURE 1A;

FIGURE 5 is a longitudinal sectional view taken along the plane of section line 5—5 of FIGURE 1A. It shows the cam teeth in the clutch plate clamping position;

Figure 2:
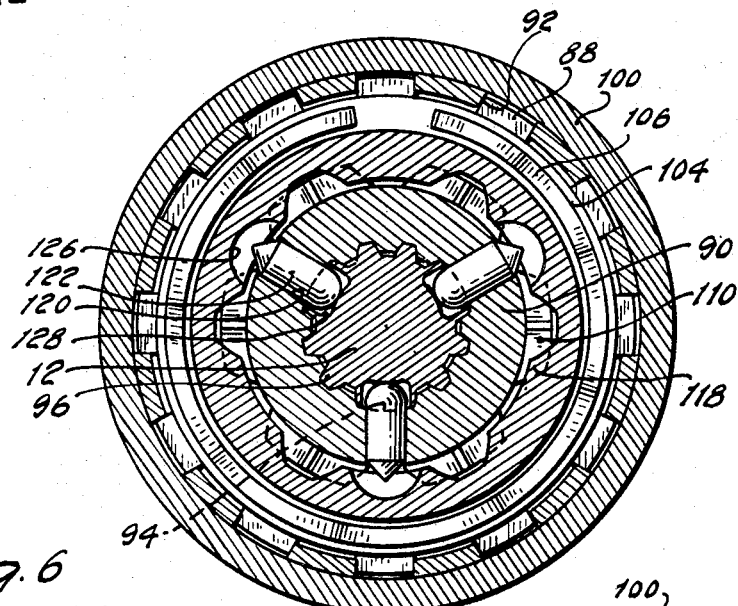
FIGURE 2 is a transverse cross-sectional view taken along the plane of section line 2—2 of FIGURE 1A.

FIGURE 8 is an enlarged view of position of FIGURE 1A. It shows the clutch plates disengaged; and FIGURE 9, like FIGURE 8, is an enlarged view of portion of FIGURE 1A. It shows the clutch plates in the engaged position under the influence of the initial spring pressure.

Numeral 10 in FIGURE 1A designates a power input shaft for the transmission mechanism. A driven shaft is shown at 12. The shaft 10 is splined at 14 to permit a splined connection with the hub of a neutral friction clutch not shown. The neutral clutch is adapted in the usual fashion to establish and disestablish a driving connection between the crankshaft of an internal combustion vehicle engine and the shaft 10. The shaft 12 on the other hand can be connected by means of a suitable drive shaft and differential and axle assembly with vehicle drive wheels in an automotive vehicle driveline.

Shaft 10 extends through a stationary sleeve 16 formed on a forward wall 18 which in turn is adapted to be connected at its periphery to a shoulder 22 formed on a transmission housing 24.

Shaft 10 is formed with a bearing flange 26 which is journalled by means of the bearing 28 within a bearing recess 30 formed in the wall 18. A power input gear 32 of the multiple ratio gearing arrangement is formed integrally with the flange 26.

Gear 32 engages a gear element 34 of a cluster gear assembly 36. The assembly 36 is mounted for rotation about an axis that is parallel to the axis of shaft 10. When one end of the assembly 36, as shown at 38, is received in a bearing recess 40 formed in the ball 18, the other end 42 is rotatably journalled within a boss 44 which forms a part of the housing 24.

There are three cluster gear assemblies 36 situated at equally spaced intervals about the axis of shaft 10, each cluster gear assembly being rotatably journalled upon an axis parallel to the axis of shaft 10.

Formed on the cluster gear assembly 36, and also on each of the corresponding cluster gear assemblies, there are three other gear elements as shown at 46, 48 and 50. Gear element 46 engages drivably in a continuous fashion torque output gear 52 which is mounted for rotation about the axis of shaft 10 and the gear 32. Gear 52 engages each of the cluster gear assemblies and is rotatably supported by them. No other supporting means is required.

Gear element 48 engages another torque output gear 54. The other gear elements of the other cluster gear assemblies corresponding to gear element 48 engage also gear 54 thereby supporting gear 54 for rotation about the common axis for gear 32 and gear 52.

Gear element 50 of the cluster gear assembly 36 engages drivably three reverse drive pinions 56 that are angularly spaced about the axis of shaft 10. Each pinion is drivably engaged with a reverse drive torque output gear 58 which is supported for rotation about the common axis of gears 32, 52 and 54 by the pinions 56. Gear element 50 of the cluster gear assembly 36 drivably engages each of the reverse drive pinions 56.

Each pinion is mounted for rotation about a pinion shaft 61. Each shaft is supported by bosses, as shown at 63 and 65, which form a part of the housing 24. These bosses, respectively, are formed with openings 66 and 68 for receiving the ends of the shaft 61.

Each of the gears and the elements of the cluster gear assemblies are formed with herringbone gear teeth. because of this, axially directed thrust loads due to gear tooth loading are eliminated. The power output shaft 12 extends coaxially with respect to the shaft 10 within the gear 32, 52, 54 and 58. Each of these gears is formed with a central opening.

The left-hand end of shaft 12, as shown at 60, is journalled by means of a bearing 62 within the bearing opening 64 formed in the bearing flange 26 carried by shaft 10. The right-hand end of shaft 12, as seen in FIGURE 1B, is supported rotatably by means of a bearing 66 within a tailshaft extension housing 69. This housing is secured at its left-hand margin 70 to the right-hand margin of the housing 24.

Situated within the gears 32, 52, 54 and 58 and concentrically mounted about the shaft 12, is a synchronizer sleeve shaft 72. It has formed on its left-hand end a series of external synchronizer clutch teeth 74. These are adapted to mesh with internal clutch teeth 76, 78, 80 and 82 formed, respectively, on the inner periphery of the gears 32, 52, 54 and 58. Teeth 74 are adapted to engage selectively the teeth of the torque output gears as sleeve shaft 72 is shifted in a longitudinal direction. When it assumes the position shown in FIGURE 1, teeth 74 drivably engage teeth 76.

The right-hand end of sleeve shaft 72 is externally splined to permit a driving connection with internally splined cluch discs 84 of a synchronizer clutch assembly 86. Externally splined clutch discs 88 of the clutch assembly 86 are carried by a synchronizer clutch hub 19 having a peripheral portion that is formed with splined grooves 92 for receiving external splines of discs 88.

A hub 90 is splined at its center 94 to an externally splined portion 96 of shaft 12. The hub 90 is connected to the sleeve shaft 72 by means of a ball connection 98 which permits rotary motion of the sleeve 72 with respect to the hub 90, but which allows the hub 90 to shift the sleeve 72 longitudinally. The connection 98 is defined by annular grooves formed in the hub 90 and in the sleeve 72 in juxtaposed relationship. The grooves are of semi-circular cross section and the balls register with them.

Surrounding the clutch disc assembly 96 is a clamping drum 100 having formed thereon a reaction plate 102 which is annular in form and which is situated directly adjacent the discs 84 and 88. A clamping ring 104 is situated on the opposite side of the discs 84 and 86. This ring is urged normally into frictional engagement with the discs of the clutch assembly 86 by means of a spring 106 situated between the hub 90 and the ring 104. By preference the spring 106 is undulated as indicated in FIGURE 4.

Figure 6:
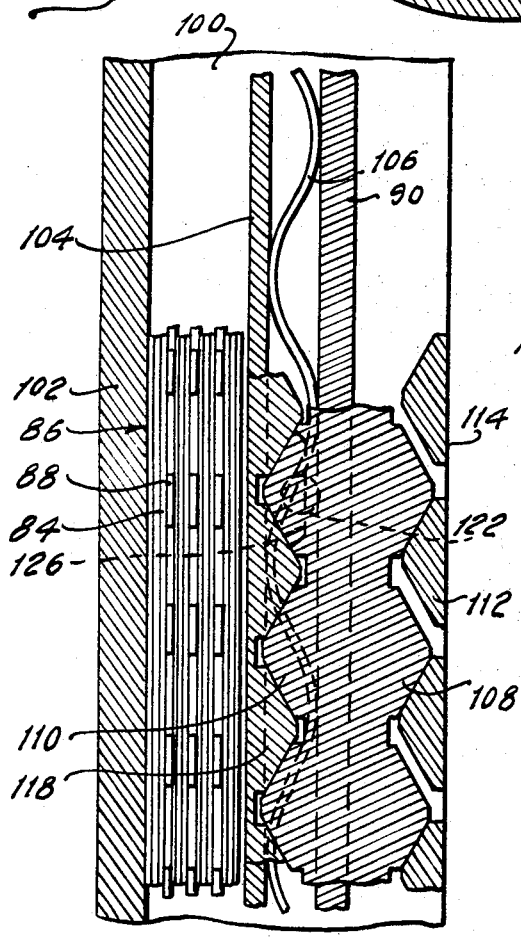
FIGURE 6 is a longitudinal view similar to FIGURE 5 and taken along the plane of section line 6—6 of FIGURE 9. It shows the clutch spring as it begins to exert a clutch plate clamping force.
Figure 7:
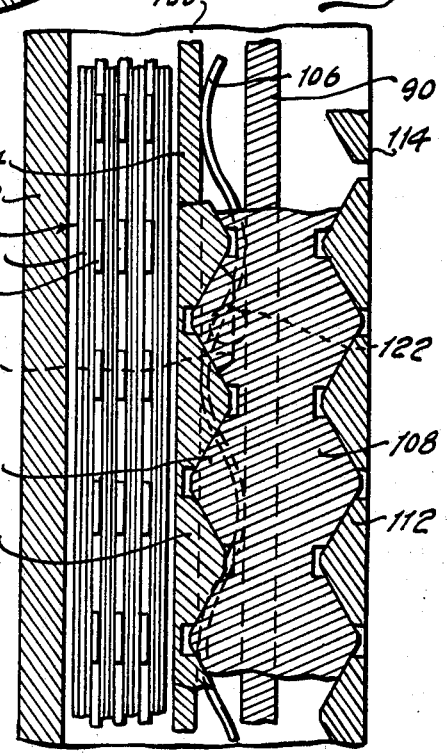
FIGURE 7 is a longitudinal sectional view taken along the plane of section line 7—7 of FIGURE 8. It shows the synchronizer clutch plates fully disengaged.

As indicated in FIGURE 6, hub 90 is formed with two sets of teeth. The teeth of the individual sets are identified respectively by reference characters 108 and 110. The sides of the teeth of each set are tapered as indicated.

Registering with the teeth 108 are teeth 112 formed on the inner periphery of a clamping element 114 carried by the drum 100. A spline or a key-and-slot connection is provided between the outer periphery of element 114 and drum 100 as indicated at 116. The teeth 110 are adapted to register with teeth 118 carried by the inner margin of the clamping ring 104. Teeth 118, like teeth 112, are formed with tapered sides. If the drum 100 tends to shift angularly in either direction with respect to the hub 90, a camming action will take place between teeth 108 and 112 which would tend to shift the element 114 and the hub 90 away from each other. In a similar fashion relative rotary motion tends to take place between clamping ring 104 and hub 90. Teeth 118 and teeth 110 then will cam against each other, thereby tending to separate the ring 104 and the hub 90.

Radial openings 120 are formed in the hub 90. Situated within each opening 120 is a pin 122 having a coned radially outward end 124 and a rounded radially inward end. The coned outer end of the pin 122 is engageable with the tapered side 126 of a recess formed in the inner periphery of the ring 104. This is best seen in FIGURE 2. The inner end of the pin 122 is engageable with any one of several longitudinally spaced recesses 128 formed in the shaft 12. There is one such recess for each speed ratio. The recess corresponding to the high speed ratio is identified by the numeral 128. The recess corresponding to the intermediate speed ratio is shown at 130. The recess corresponding to the low speed ratio is shown at 132 and the recess corresponding to the reverse drive ratio is shown at 134. In the embodiment shown, there are three such pins as indicated in FIGURE 2.

As the hub 90 is shifted axially along the shaft 12, the pins 122 will rise and fall as they enter and leave the various recesses 128 through 134. This shifting motion is accomplished by means of a shift lever 136, the radially inward end of which is received within an annular groove 138 formed in the hub 90. The other end of the lever 136 is carried by a shift rod 140. This rod is slidably mounted within an opening 142 formed in a boss 144 in the housing 70. The end of rod 140, which extends outwardly from the housing, is adapted to be connected to a suitable driver operated shift linkage, not shown.

During operation it is possible to obtain speed ratio shifts by employing a simple longitudinal motion of the sleeve shaft 72. This is accomplished by the vehicle operator as he shifts the hub 90 in an axial direction. If it is assumed that the sleeve 72 is positioned as shown in FIGURE 1, engine torque is delivered through the neutral clutch, not shown, to the shaft 10. It then passes from shaft 10, through gear 32, and through the splined connection between teeth 74 and 76. The torque applied to the sleeve shaft 72 then is transferred through the engaged multiple disc clutch assembly 86 to the hub 90 and hence to the power output shaft 12.

During a shifting operation the teeth 74 assume a position intermediate the torque output gears following disengagement of the neutral clutch. If it is assumed, for example, that the teeth 74 are positioned between the gears 32 and 52, the teeth 74 will be situated intermediate the teeth 76 and 78. While the neutral clutch is disengaged, the sleeve shaft 72 can be shifted in a left-hand direction by appropriately manipulating the shift linkage. The teeth 74 then can engage teeth 76. A minimum amount of clashing is experienced at that time since the amount of inertia of the shaft 72 is rather slight. Thus any differential motion between the shaft 72 and the gears 32 will not result in undesirable lurching or clutch teeth clashing as the teeth 74 engage the gear teeth 76.

When the teeth 74 are positioned between gears 32 and 52, the pins 122 are urged radially outwardly by the cam surface provided by the recesses 128. The radially inward ends of the pins 122 thus engage a high point on the shaft 12 intermediate recesses 128 and 130. At that time the coned end 124 of the pins 122 cams against the cooperating cam surface 126 of the clamping ring 104. This causes the clamping ring to relieve its clamping pressure against the clutch discs 84 and 88. After the clutch teeth 74 and 76 move into engagement, however, the pin 122, upon shifting movement of the hub 90 in a left-hand direction, begins to register with recess 128. This allows spring 106 to move the clamping plate 104 into frictional engagement with the clutch discs thereby triggering the clutch application. A slight amount of torque then is applied to the drum 100. This immediately establishes a camming action between the teeth 108 and 122 and between the teeth 110 and 118. The amount of the torque delivered is proportional to the axially directed force applied to the clamping plate by reason of the camming action. The force of the clamping plate 104 is opposed and balanced by the reaction force on reaction ring 102 carried by the drum 100. Thus the clutch engagement occurs with a self-energizing action wherein the degree of clutch engagement is proportional to the torque being delivered from the sleeve 72 to the power output shaft 12. The clutch begins to engage, however, only after the teeth 74 and 76 are in driving engagement. The neutral clutch can be re-engaged at any time following the engagement of teeth 74 and 76.

It is apparent, therefore, that a driving connection can be established in a smooth and continuous fashion simply by manipulating a single control shaft, in one direction or the other, parallel to the axis of the torque output gears.

If a downshift is desired, it is merely necessary to disengage again the neutral clutch and shift the sleeve 72 in a right-hand direction. As this is done, the pin 122 again rides over the cam surface of the recess 128 until the clamping ring 104 is urged out of engagement with the clutch discs. The clutch disc assembly 86 thus interrupts the torque delivery path between the sleeve 72 and the power output shaft 12. Continued motion of the sleeve 72 in a right-hand direction will cause the pin 122 to engage the recess 130. This causes the clamping ring 104 to move again into frictional engagement with the multiple disc clutch assembly 86 under the influence of the spring 106. Before this occurs, however, the teeth 74 will have engaged the teeth 78. Thus at a time prior to the partial engagement of the multiple disc clutch assembly 86, the sleeve 72 is moving at the same speed as the gear 52. Clutching action between the teeth 78 and 74 takes place with a minimum amount of clashing because of the reduced moment of inertia of the sleeve 72.

Partial engagement of the multiple disc clutch assembly 86 under the influence of the spring 106 will permit a limited amount of torque to be distributed from the shaft 72 to the power output shaft 12. This torque causes a camming action of the teeth 108 and 112 and also a camming action between the teeth 110 and 118. This camming action causes the multiple clutch disc assembly 86 to become engaged fully. The magnitude of the pressure applied to the clutch discs 84 and 88 thus is proportional to the amount of torque being distributed to the power output shaft 12.

Intermediate speed ratio operation occurs as the clutches engage following engagement of the teeth 74 and 78.

To establish low speed ratio operation, it is merely necessary to engage the teeth 74 and 80. This is done in the same way previously described with respect to teeth 74 and 78. Synchronism is established at a time prior to full clutch engagement.

To establish reverse drive operation, it is merely necessary to shift the teeth 74 in a right-hand direction until they engage teeth 82. Again synchronism occurs as the teeth 74 and the teeth 82 engage. A full torque delivery path is established following such engagement when feedback or self-energizing forces are applied to the clutch discs 84 and 88 in the manner previously described.

The reverse torque delivery path includes a shaft 10, the gear 32 with cluster gear assembly 36, reverse pinions 56 and a reverse gear 58.

Having thus described a preferred form of my invention, what I claim and desire to secure by U.S. Letters Patent is:

1. A power transmission mechanism adapted to deliver driving torque from a driving shaft to a driven shaft, a power input gear connected to said driving shaft, a plurality of cluster gear assemblies mounted for rotation about axes that are parallel to the axis of said driving shaft, torque output gears mounted coaxially with respect to said power input gear, a separate gear element of each cluster gear assembly engaging drivably a separate one of said torque output gears, a synchronizer shaft coaxially mounted with respect to the axis of said driving shaft, first clutch teeth carried by said synchronizer shaft, second clutch teeth carried by each of said torque output gears and said power input gear, a synchronizer clutch hub surrounding said power output shaft and splined thereto whereby it is adapted to shift axially with respect to said driven shaft, a multiple disc clutch assembly including first friction discs carried by said synchronizer shaft and second friction discs carried by said hub, a clamping ring situated on one side of said discs, a reaction disc clamping element having a portion thereof situated on the other side of said discs, and a pair of synchronizer cam clutch teeth carried by said hub, said clamping element and said clamping ring having formed thereon synchronizer cam teeth that respectively register with the synchronizer cam teeth of said synchronizer hub whereby a clamping force is applied to said discs when torque is delivered from said synchronizer shaft to said driven shaft through said clutch discs.

2. A power transmission mechanism adapted to deliver driving torque from a driving shaft to a driven shaft, a power input gear connected to said driving shaft, a plurality of cluster gear assemblies mounted for rotation about axes that are parallel to the axis of said driving shaft, torque output gears mounted coaxially with respect to said power input gear, a separate gear element of each cluster gear assembly engaging drivably a separate one of said torque output gears, a synchronizer shaft coaxially mounted with respect to the axis of said driving shaft, first clutch teeth carried by said synchronizer shaft, second clutch teeth carried by each of said torque output gears in said power input gear, a synchronizer clutch hub surrounding said power output shaft and splined thereto whereby it is adapted to shift axially with respect to said driven shaft, a multiple disc clutch assembly including first friction discs carried by said synchronizer shaft and second friction discs carried by said hub, a clamping ring situated on one side of said discs, a reaction disc clamping element having a portion thereof situated on the other side of said discs, and a pair of synchronizer cam clutch teeth carried by said hub, said clamping element and said clamping ring having formed thereon synchronizer cam teeth that respectively register with the synchronizer cam teeth of said synchronizer hub whereby a clamping force is applied to said discs when torque is delivered from said synchronizer shaft to said driven shaft through said clutch discs, and means for manually adjusting said synchronizer clutch hub in the direction of the axis of said driven shaft whereby said synchronizer clutch shaft is shifted from engagement with the teeth of one output gear and into engagement with teeth of another output gear as a speed ratio change is effected.

3. The combination as set forth in claim 2 wherein said hub comprises a clutch release element carried in an opening in said hub and adapted to move with respect to said hub in a radial direction, said clamping ring having formed thereon a cam surface, said radially movable element registering with said cam surface upon movement thereof in a radial outward direction whereby said clamping ring is moved out of clamping engagement with said discs, and a plurality of cam recesses formed on said driven shaft at longitudinally spaced locations, the radially inward end of said radially movable element registering with said recesses selectively as said hub is shifted longitudinally during speed ratio changes.

4. The combination as set forth in claim 2 wherein said hub comprises a clutch release element carried in an opening in said hub and adapted to move with respect to said hub in a radial direction, said clamping ring having formed thereon a cam surface, said radially movable element registering with said cam surface upon movement thereof in a radial outward direction whereby said clamping ring is moved out of clamping engagement with said discs, and a plurality of cam recesses formed on said driven shaft at longitudinally spaced locations, the radially inward end of said radially movable element registering with said recesses selectively as said hub is shifted longitudinally during speed ratio changes, said radially movable element being situated between two adjacent recesses in said driven shaft when the teeth of said synchronizer sleeve shaft and the teeth of one of said gears are out of registry.

5. The combination as set forth in claim 3 wherein said hub comprises spring means situated between said clamping element and said clamping ring whereby said clamping ring normally is urged into frictional engagement with said clutch discs.

6. The combination as set forth in claim 4 wherein said hub comprises spring means situated between said clamping element and said clamping ring whereby said clamping ring normally is urged into frictional engagement with said clutch discs.

7. The combination as set forth in claim 1 wherein said synchronizer shaft and said hub include interlocking parts with a bearing element registering with said interlocking parts to provide a rotary connection between said hub and said synchronizer shaft whereby said hub and said synchronizer shaft move in unison in a longitudinal direction although relative rotary motion therebetween is accommodated.

8. The combination as set forth in claim 2 wherein said synchronizer shaft and said hub include interlocking parts with a bearing element registering with said interlocking parts to provide a rotary connection between said hub and said synchronizer shaft whereby said hub and said synchronizer shaft move in unison in a longitudinal direction although relative rotary motion therebetween is accommodated.

9. The combination as set forth in claim 3 wherein said synchronizer shaft and said hub include interlocking parts with a bearing element registering with said interlocking parts to provide a rotary connection between said hub and said synchronizer shaft whereby said hub and said synchronizer shaft move in unison in a longitudinal direction although relative rotary motion therebetween is accommodated.

10. The combination as set forth in claim 4 wherein said synchronizer shaft and said hub include interlocking parts with a bearing element registering with said interlocking parts to provide a rotary connection between said hub and said synchronizer shaft whereby said hub and said synchronizer shaft move in unison in a longitudinal direction although relative rotary motion therebetween is accommodated.

11. The combination as set forth in claim 5 wherein said synchronizer shaft and said hub include interlocking parts with a bearing element registering with said interlocking parts to provide a rotary connection between said hub and said synchronizer shaft whereby said hub and said synchronizer shaft move in unison in a longitudinal direction although relative rotary motion therebetween is accommodated.

12. The combination as set forth in claim 5 wherein said synchronizer shaft and said hub include interlocking parts with a bearing element registering with said interlocking parts to provide a rotary connection between said hub and said synchronizer shaft whereby said hub and said synchronizer shaft move in unison in a longitudinal direction although relative rotary motion therebetween is accommodated.

References Cited

UNITED STATES PATENTS

| | | | |
|---|---|---|---|
| 1,947,033 | 2/1934 | Bush | 74—372 |
| 2,763,350 | 9/1956 | Klave | 192—3.5 |
| 3,283,613 | 11/1966 | Perkins | 74—331 |

FOREIGN PATENTS

| | | |
|---|---|---|
| 650,577 | 2/1951 | Great Britain. |

FRED C. MATTERN, Jr., *Primary Examiner.*

ROBERT A. O'LEARY, *Examiner.*

H. S. LAYTON, *Assistant Examiner.*